United States Patent
Yuan

(10) Patent No.: US 8,006,206 B1
(45) Date of Patent: *Aug. 23, 2011

(54) GATED CLOCK CONVERSION

(75) Inventor: Jinyong Yuan, Cupertino, CA (US)

(73) Assignee: Altera Corporation, San Jose, CA (US)

( * ) Notice: Subject to any disclaimer, the term of this patent is extended or adjusted under 35 U.S.C. 154(b) by 441 days.

This patent is subject to a terminal disclaimer.

(21) Appl. No.: 12/174,632

(22) Filed: Jul. 17, 2008

Related U.S. Application Data

(63) Continuation of application No. 11/359,297, filed on Feb. 21, 2006, now Pat. No. 7,424,689.

(51) Int. Cl.
*G06F 17/50* (2006.01)

(52) U.S. Cl. ........................ 716/100; 716/101

(58) Field of Classification Search .................. 716/1, 2, 716/18, 100–103
See application file for complete search history.

(56) References Cited

U.S. PATENT DOCUMENTS

| | | | | |
|---|---|---|---|---|
| 7,424,689 | B1 * | 9/2008 | Yuan | 716/134 |
| 2007/0130549 | A1 * | 6/2007 | Eisner et al. | 716/2 |

* cited by examiner

*Primary Examiner* — Jack Chiang
*Assistant Examiner* — Binh C Tat
(74) *Attorney, Agent, or Firm* — Ropes & Gray LLP

(57) ABSTRACT

Gated clock signals in ASIC designs are automatically optimized for implementation with a programmable device. Components having gated clock signals are identified and converted to operate directly from the base clock signal. To maintain compatibility, the data signal to the component is modified to connect with additional input logic responsive to a clock enable signal. The input logic modifies the signal received by the component's data input so that the component's output in response to the clock enable signal is unchanged. To this end, a system and method may identify the logic cone associated with a gated clock signal, convert this logic cone into a Boolean expression, and determine cofactors of the base clock signal from this Boolean expression. The input logic and clock enable logic are derived from an analysis of the cofactors of the base clock signal.

20 Claims, 8 Drawing Sheets

GATED CLOCK CONVERSION

CROSS REFERENCE TO RELATED APPLICATIONS

This application is a continuation of U.S. patent application Ser. No. 11/359,297, titled GATED CLOCK CONVERION, by Jinyong Yuan, filed Feb. 21, 2006, which is incorporated by reference.

BACKGROUND OF THE INVENTION

The present invention relates to the field of programmable devices, and the systems and methods for programming the same. Programmable devices, such as FPGAs, typically includes thousands of programmable logic cells that use combinations of logic gates and/or look-up tables to perform a logic operation. Programmable devices also include a number of functional blocks having specialized logic devices adapted to specific logic operations, such as adders, multiply and accumulate circuits, phase-locked loops, and one or more embedded memory array blocks. The logic cells and functional blocks are interconnected with a configurable switching circuit. The configurable switching circuit selectively routes connections between the logic cells and functional blocks. By configuring the combination of logic cells, functional blocks, and the switching circuit, a programmable device can be adapted to perform virtually any type of information processing function.

One common application for programmable devices is to serve as a prototype for application specific integrated circuits (ASICs). Programmable devices can implement the logic of an ASIC design, thereby acting as a functional equivalent to the ASIC. The programmable device can then be tested to ensure the ASIC design functions as intended. Programmable devices allow prototypes of ASICs to be created and evaluated quickly and inexpensively, especially as compared to the cost of custom fabrication of an ASIC.

ASIC designs often include gated clocks signals to dynamically shut down portions of the ASIC that are not in use, thereby conserving power. A gated clock is a clock signal that is a function of one or more base clock signal and/or one or more other inputs, such as clock enable signals. A base clock is a pin, register, or clock output port of a functional block such as a phase-locked loop (PLL) that provides a clock signal for synchronizing registers and other components of a programmable device. Typically, a gate clock signal is created by passing at least one base clock signal through combinatorial logic gates and/or registers.

A typical large ASIC design might include hundreds of different clock trees. However, some programmable devices have only a limited amount of resources available for global clock networks. Thus, the large number of clock trees of the ASIC design can overwhelm the resources of the programmable device.

Additionally, even if a programmable device has sufficient resources to implement all of the numerous clock trees of a complex ASIC design, timing closure problems often arise. Programmable logic cells are relatively slow as compared with dedicated logic circuits. Programamble devices typically implement gated clock logic of an ASIC design using programmable logic cells. Because of their relatively slow operating speed, the programmable logic cells implementing gated clock logic introduce substantial clock skew between registers and other components using the base clock signal and those using gated clock signals.

To overcome this problem, designers can replace gated clock networks of the ASIC design with functionally equivalent input logic when adapting this type of ASIC design for implementation on a programmable device. The functionally equivalent input logic typically allows a register to be clocked directly from a base clock signal, rather than a gated clock signal. The functionally equivalent input logic modifies the data input to a register so that the functionality of the register in response to clock enable signal is unchanged. Previously, designers would have to perform this conversion manually, which is not only tedious and time-consuming but also potentially error-prone.

It is therefore desirable for a system and method to automatically identify gated clock signals in a design and to automatically convert these gated clock signals to functionally equivalent input logic. It is further desirable for the system and method to ensure that the input logic substituted for gated clock signals in a programmable device does not inadvertently introduces glitches or other errors.

BRIEF SUMMARY OF THE INVENTION

An embodiment of the invention includes a system and method to automatically optimize gated clock signals in ASIC designs for implementation with a programmable device. In an embodiment, the system and method identifies components having gated clock signals and converts the components to operate directly from the base clock signal. To maintain compatibility, the system and method also connects the data signal to the component with additional input logic responsive to a clock enable signal. The input logic modifies the signal received by the data input of the component so that the output of the component in response to the clock enable signal is unchanged. In an embodiment, the system and method identifies the logic cone associated with a gated clock signal, converts this logic cone into a Boolean expression, and determines cofactors of the base clock signal from this Boolean expression. The input logic and clock enable logic are derived from an analysis of the cofactors of the base clock signal.

In an embodiment, a method of optimizing a design includes receiving a design including a base clock signal and identifying a component of the design having a data input connected with a data signal and clock input connected with a gated clock signal. The gated clock signal is a product of a function of at least the base clock signal and an input signal. This embodiment of the method identifies a portion of the design performing the function on the base clock signal to produce the gated clock signal and creates an equivalent Boolean expression. The Boolean expression includes a first input variable corresponding with the base clock signal and a second input variable corresponding with the input signal.

In an embodiment, the method reduces the Boolean expression to cofactors of the first input variable and evaluates the cofactors for values of a set of input values of at least the second input variable. In response to a determination that one of the cofactors has a constant value for the set of input values, the embodiment of the method modifies the design by connecting the clock input of the component with the base clock signal and connecting the data input of the component with a modified data signal. The modified data signal is provided by input logic performing a second function of the data signal and a second input signal.

In a further embodiment, the input logic is adapted to hold the component at a current state value when the second input signal is in a first state and to present the data signal to the data input of the component when the second input signal is in a second state.

In another embodiment, the modified design further includes logic performing a third function to produce the second input signal. The third function may be equivalent to the non-constant cofactor.

BRIEF DESCRIPTION OF THE DRAWINGS

The invention will be described with reference to the drawings, in which.

DETAILED DESCRIPTION OF THE INVENTION

Figure 1A:
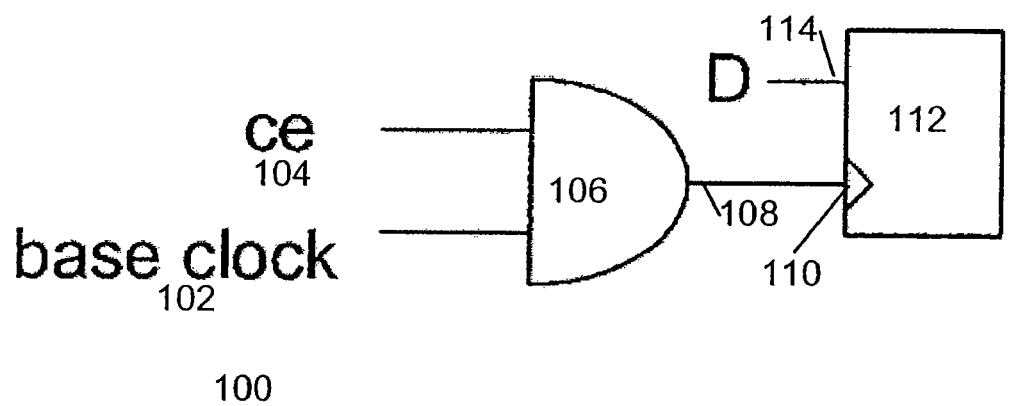
FIGS. 1A-1C illustrate an example gated clock input and corresponding clock enable input logic suitable for use with an embodiment of the invention.

FIGS. 1A-1 illustrate an example gated clock input and corresponding clock enable input logic suitable for use with an embodiment of the invention. FIG. 1A illustrates an example design 100 including a gated clock signal. Example design 100 includes a base clock signal 102 and a clock enable signal 104 connected with combinatorial logic 106. The output of the combinatorial logic 106 is a gated clock signal output 108. The gated clock signal output 108 is connected with a clock input 110 of a register 112. Register 112 also includes a data input 114.

In this example 100, the combinatorial logic 106 includes an AND logic gate. Thus, when the clock enable signal 104 is asserted, the base clock signal 102 will pass through the combinatorial logic 106 and produce a corresponding clock signal from gated clock signal output 108. Conversely, when the clock enable signal 104 is deasserted, the gated clock signal output 108 will be constant. As a result, the operation of the register 112 will be suspended, reducing dynamic power consumption.

Although the combinatorial logic 106 is illustrated in example 100 as an AND logic gate for the purposes of illustration, typical ASIC designs can include more complex combinatorial logic circuits that may include multiple logic gates of any type or function, one or more registers, and any other type of digital logic component. Embodiments of the invention as described below are intended for use with combinatorial logic of any arbitrary function and complexity, and the combinatorial logic 106 in FIG. 1A is not intended as a limitation on the applicability of the invention.

Figure 1B:
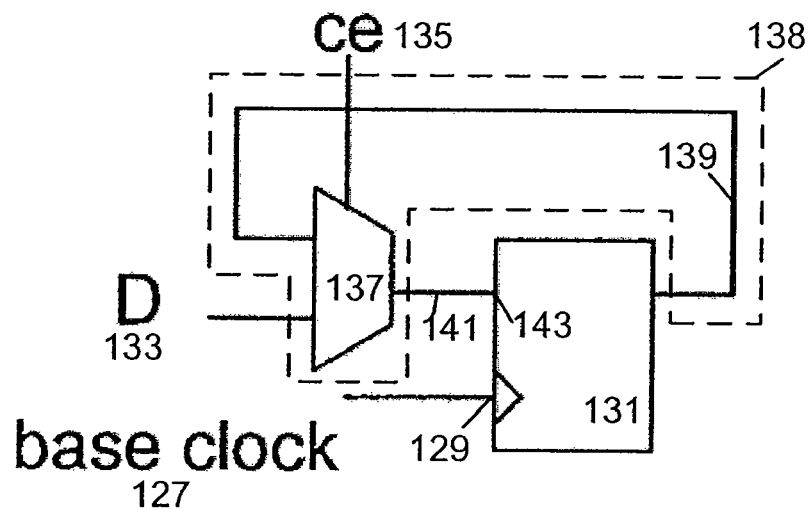

FIG. 1B illustrates an example design 125 including functionally equivalent input logic corresponding with the gated clock signal output 108 of example design 100. Example design 125 includes a base clock signal 127 connected directly with the clock input 129 of a register 131. A data input signal 133 is connected with functionally equivalent input logic 138 including a multiplexer 137. The data input signal 133 is connected with an input of the multiplexer 137. The output 139 of the register 131 is connected with another input of the multiplexer 137. A clock enable signal 135 selects one of the multiplexer inputs to connect with the multiplexer output 141. The multiplexer output 141 is connected with a data input 143 of the register 131.

In this example, the register 131 is clocked normally using the base clock signal 127. When the clock enable signal 135 is asserted, the data input signal 133 is connected with the data input 143 of the register 131 via the functionally equivalent input logic 138. Conversely, when the clock enable signal 135 is deasserted, the functionally equivalent input logic 138 connects the output 139 of the register 131 with the data input 143 of the register 131. As a result, the register 131 maintains its current state. The example design 125 is functionally equivalent to example design 100; however, because example design 125 does not include a gated clock signal, it is better suited for implementation with a programmable device.

The example designs 100 and 125 use registers that function as "D"-type flip-flops. However, embodiments of the invention are equally suitable for use with registers that function as "T"-type, "SR"-type, "JK"-type, or any other type of flip-flop or other bistable circuit. Additionally, more complicated or specialized components, such as synchronous memory units, MAC units, ALU units, I/O interfaces, and communication units, may include registered data access ports, such as data inputs or data outputs, driven by gated clock signals. Thus, embodiments of the invention may be used similarly with these more complicated or specialized components.

As discussed in detail below, embodiments of the invention can automatically identify combinatorial logic in designs associated with gated clock signals, such as example 100 of FIG. 1A, and automatically convert these designs to functionally equivalent designs, such as example 125 of FIG. 1B, better suited for implementation with programmable devices.

Figure 1C:
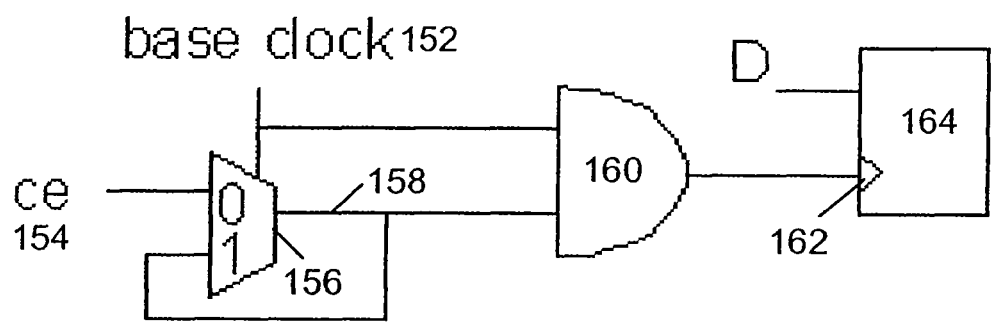

FIG. 1C illustrates an additional example design 150 that includes gated clock signals. Example design 150 includes a base clock signal 152 and a clock enable signal 154. The base clock signal 152 controls the selection of a multiplexer 156 and is also connected with an input of combinatorial logic 160. Combinatorial logic 160 in example design 150 is an AND logic gate; however, more complex combinatorial logic configurations are equally suitable for use with embodiments of the invention.

Clock enable signal 154 is connected with an input of multiplexer 156. The output 158 of multiplexer 156 is also connected with an input of multiplexer 156. The output 158 of multiplexer 156 is connected with an input of combinatorial logic 160. The output of the combinatorial logic 160 is provided to a clock input 162 of a register 164.

As discussed in detail below, embodiments of the invention can automatically identify combinatorial logic in designs associated with gated clock signals, such as example designs 100 and 150, and automatically convert these designs to functionally equivalent designs, similar to example design 125, that are better suited for implementation with programmable devices.

Figure 2:
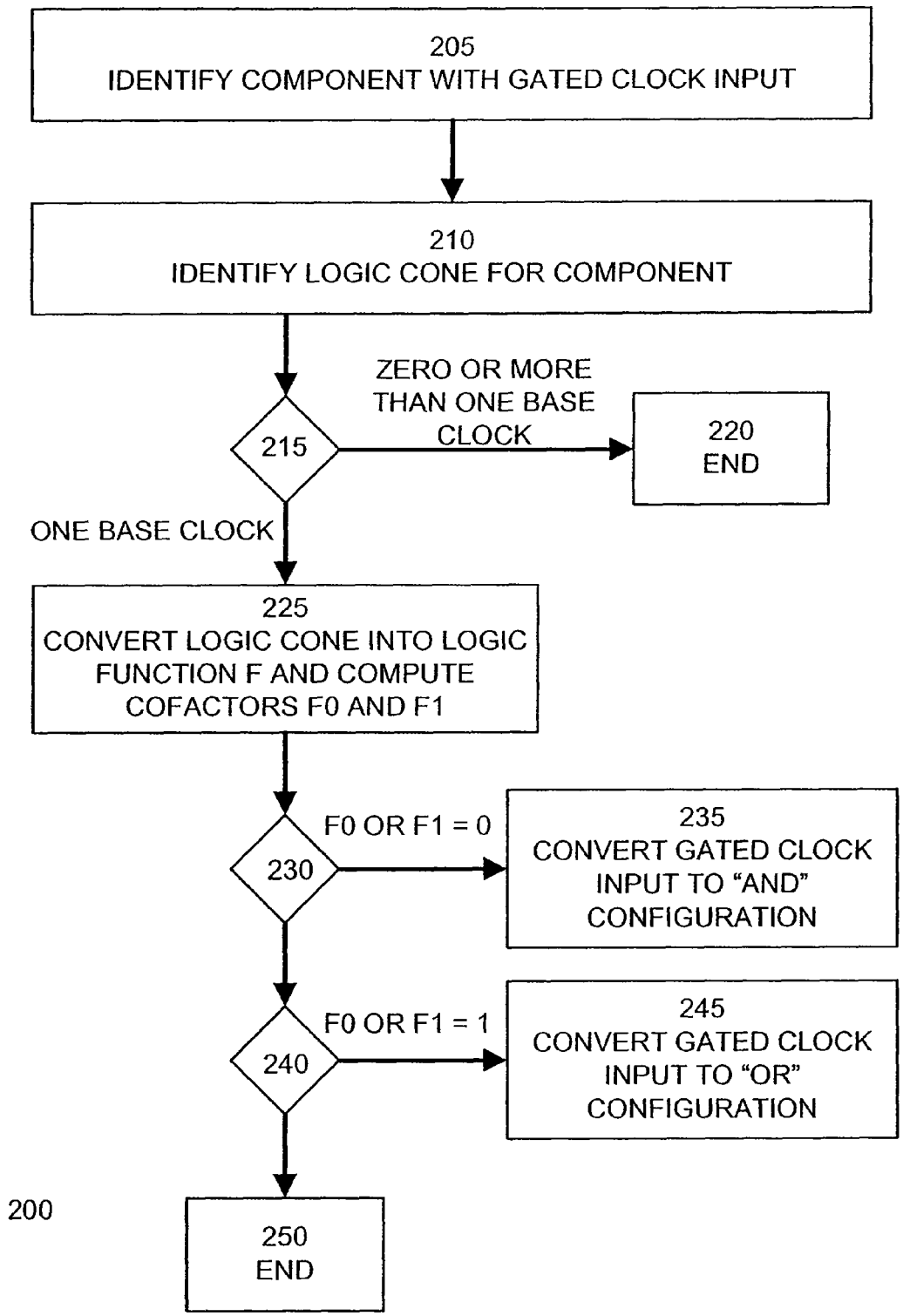
FIG. 2 illustrates a method of automatically convert gated clock networks into equivalent clock enable input logic for data signals according to an embodiment of the invention.

FIG. 2 illustrates a method 200 of automatically convert gated clock networks into equivalent clock enable input logic for data signals according to an embodiment of the invention. Step 205 identifies a component, such as a register, memory block, I/O block, or other component of a design having a gated clock input.

Step 210 identifies the logic cone, or the set of combinatorial logic, associated with the component's gated clock signal. In an embodiment, step 210 recursively backtracks from the component's clock input along the clock path to identify all combinatorial logic connected with this clock path. This backtracking along the clock path stops at register outputs, clock and data pins, PLL outputs, or other hard boundaries of the design. Once step 210 has identified the logic cone associated with the component, step 210 also identifies the number of different base clock signals inputted to the logic cone of the component.

Decision block 215 evaluates the number of different base clock signals inputted to the logic cone of the component's clock input. Decision block 215 only counts the number of different or distinct base clock signals. If a single base clock signal is provided at two or more different inputs of the logic cone, decision block 215 only counts this as one base clock signal. If the number of base clock signals of the logic cone is zero or greater than one, method 200 proceeds to step 220 and terminates. An embodiment of step 220 provides an error or warning message indicating that this gated clock signal could not be processed. As a result, a designer can manually attempt to remove this gated clock signal from the design, or attempt to implement the design unchanged, at the cost of using additional programmable device resources.

Conversely, if the logic cone includes only one base clock signals, method 200 proceeds to step 225. Step 225 converts the logic cone into an equivalent Boolean function (F). The Boolean function F includes at least one input variable c, representing the base clock signal inputted to the logic cone. Typically, the Boolean function F will also include Step 225 determines the cofactors of the Boolean function F with respect to input variable c using standard Boolean analysis techniques, such as binary decision diagrams (BDDs). In an embodiment, step 225 factors Boolean function F into cofactors F0 and F1, such that $F = c \cdot F1 + \bar{c} \cdot F0$.

Decision block 230 evaluates the cofactors F0 and F1 for all possible input variable values (excluding input variable c, which is not a part of either cofactor). If either of the cofactors F0 or F1 are equal to zero for all possible input variable values, method 200 proceeds to step 235 to convert the component and its associated logic cone to a functionally equivalent "AND" input logic configuration.

Step 235 simplifies the Boolean equation F based on the results of the decision block 230. For example, if cofactor F0 is zero for all input variable values, then $F = c \cdot F1 + \bar{c} \cdot F0 = c \cdot F1$. Conversely, if cofactor F1 is zero then $F = c \cdot F1 + \bar{c} \cdot F0 = \bar{c} \cdot F0$. In either case, the logic cone can be reduced to a Boolean AND of the base clock signal (or its inverse) and the non-zero cofactor.

Figure 3A:
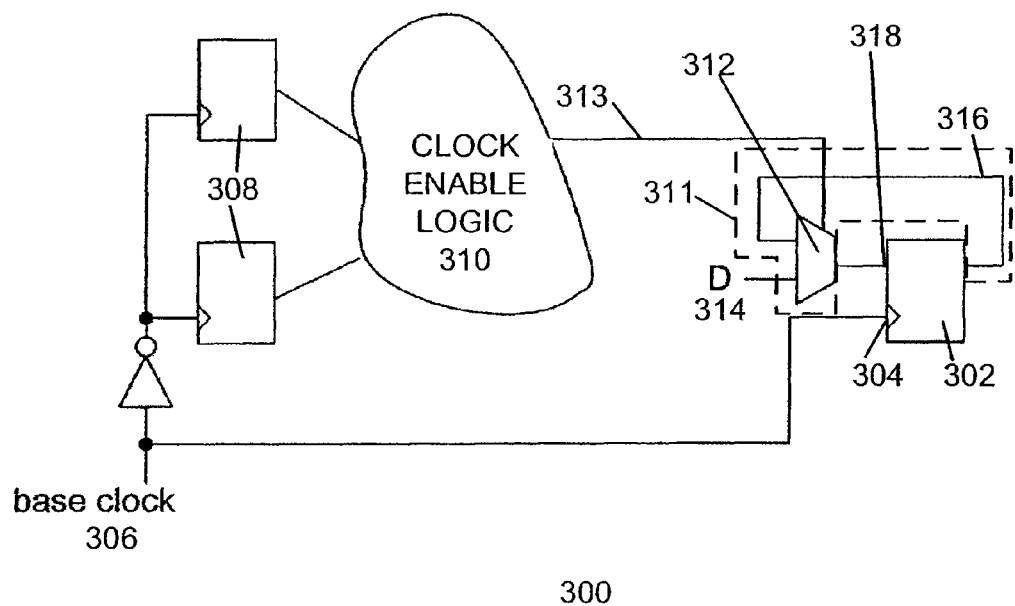
FIGS. 3A-3D illustrates an example conversions of gated clock networks into equivalent clock enable input logic according to an embodiment of the invention.

FIG. 3A illustrates an example "AND" input logic configuration 300. Example "AND" input logic configuration 300 includes a register 302. In the design, register 302 was previously specified with a gated clock signal. However, an embodiment of step 235 converts this register and its associated logic cone to example "AND" input logic configuration 300. In this configuration 300, register 302 is clocked by a base clock signal 306 connected with its clock input 304.

In configuration 300, base clock signal 306 may also be provided to one or more registers 308, which in turn provide inputs to clock enable logic 310. In an embodiment, clock enable logic 310 is equivalent to the non-zero cofactor of step 235. The output 313 of clock enable logic 310 is connected with multiplexer 312 of input logic 311. The clock enable logic output 313 selects one of the multiplexer inputs to connect with a data input 318 of the register 302. The inputs of the multiplexer 312 are the original data signal 314 to the register 302 and the output 316 of the register 302.

Figure 3B:
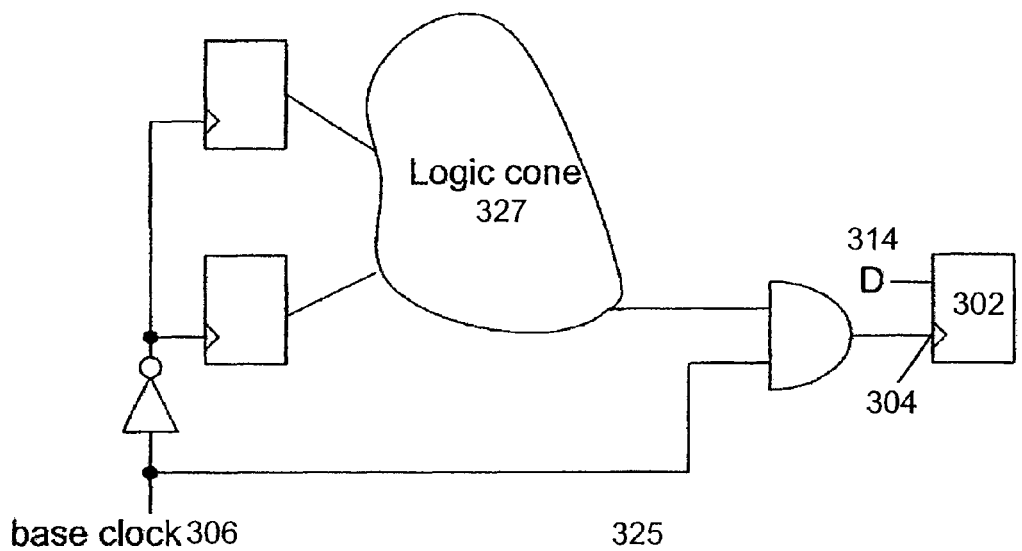

Thus, step 235 converts a portion of a design similar to example 325 of FIG. 3B into configuration 300 of FIG. 3A. In example 325, register 302 is clocked by a gated clock signal produced from the combination of a logic cone 327 and a base clock signal 306. After conversion by step 235, register 302 is clocked directly with the base clock signal 306. The data input signal 314 is gated with clock enable logic 310 and the input logic 311 and provided to data input 318 of register 302.

Returning to method 200, if decision block 230 determines that neither cofactor F0 or F1 are always zero for all input variable values, then method 200 proceeds to decision block 240. Decision block 240 determines whether cofactors F0 or F1 are equal to one for all possible input variable values. If so, then method 200 proceeds to step 245 to convert the component and its associated logic cone to a functionally equivalent "OR" input logic configuration.

Step 245 simplifies the Boolean equation F based on the results of the decision block 230. For example, if cofactor F1 is one for all input variable values, then $F = c \cdot F1 + \bar{c} \cdot F0 = c + F0$. Conversely, if cofactor F0 is one then $F = c \cdot F1 + \bar{c} \cdot F0 = \bar{c} + F1$. In either case, the logic cone can be reduced to a Boolean OR of the base clock signal (or its inverse) and the non-one cofactor.

Figure 3C:
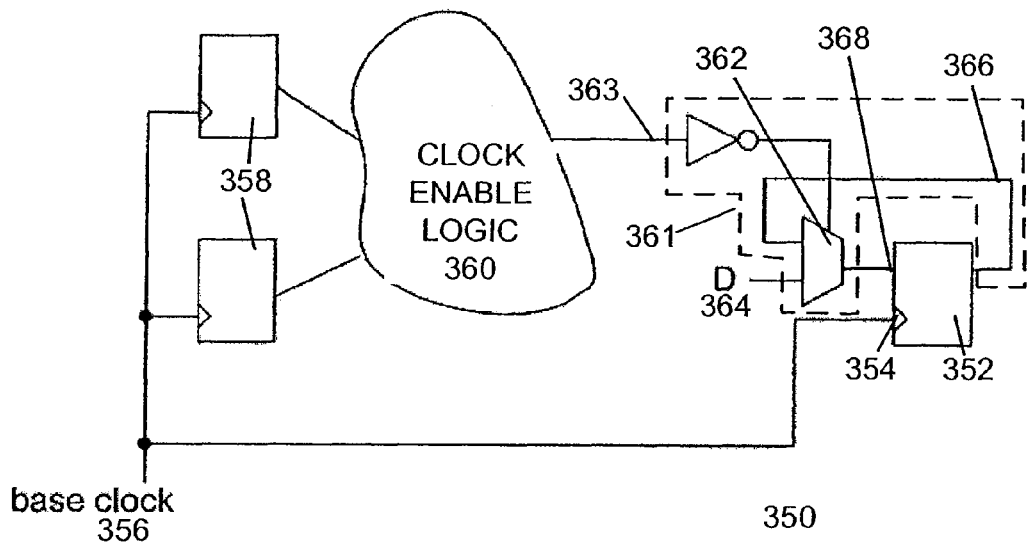

FIG. 3C illustrates an example "OR" input logic configuration 350. Example "OR" input logic configuration 350 includes a register 352. In the design, register 352 was previously specified with a gated clock signal. However, an embodiment of step 245 converts this register and its associated logic cone to example "OR" input logic configuration 350. In this configuration 350, register 352 is clocked by a base clock signal 356 connected with its clock input 354 of register 352.

In configuration 350, base clock signal 356 may also be provided to one or more registers 358, which in turn provide inputs to clock enable logic 360. In an embodiment, clock enable logic 360 is equivalent to the non-one cofactor of step 245. The output 363 of clock enable logic 310 is connected via inverter 365 with multiplexer 362 of input logic 361. The clock enable logic output 363 selects one of the multiplexer inputs to connect with a data input 368 of the register 352. The inputs of the multiplexer 362 are the original data signal 364 to the register 352 and the output 366 of the register 352.

Figure 3D:
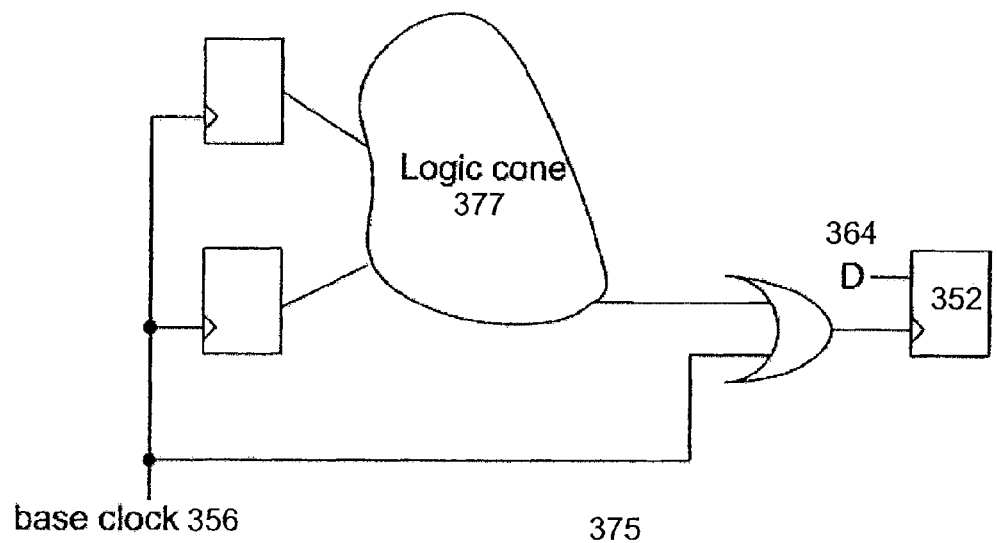

Thus, step 245 converts a portion of a design similar to example 375 of FIG. 3D into configuration 350 of FIG. 3C. In example 375, register 352 is clocked by a gated clock signal produced from the combination of a logic cone 377 and a base clock signal 356. After conversion by step 245, register 352 is clocked directly with the base clock signal 356. The data input signal 364 is gated with clock enable logic 360 and the input logic 361 and provided to data input 368 of register 352.

Returning to method 200, if decision block 240 determines that neither cofactor F0 or F1 are always equal to one, then method 200 proceeds to step 250 and terminates. In an embodiment, step 250 provides an error or warning message indicating that this gated clock signal could not be processed. As a result, a designer can manually attempt to remove this gated clock signal from the design, or attempt to implement the design unchanged, at the cost of using additional programmable device resources.

Method 200 can be repeated to optimize additional gated clock signals in a design. After some or all of the gated clock signals of the design have been evaluated and potentially converted to functionally equivalent input logic, the modified design can be processed by further compilation steps to create programmable device configuration data adapted to implement the modified design with a programmable device.

A further embodiment ensures that glitches or other errors do not result in the creation of false additional clock edges as a result of the conversion of steps 235 or 245. In this embodiment, this is done by ensuring that the non-constant cofactor does change value when the associated base clock signal is asserted.

For example, if one of the cofactors F0 or F1 is always zero or one, then in the expression $F=c \cdot F1 + \bar{c} \cdot F0$, cofactor F1 must not change value when base clock variable c is asserted. Similarly, cofactor F0 must not change value when base clock variable c is deasserted.

An embodiment of the invention enforces this rule by requiring users to designate gated clock signals in the original design as safe for optimization. In this embodiment, method 200 ignores components and gated clock signals that have not been designated by users as safe for conversion as described above.

In another embodiment, method 200 analyzes the supporting nodes, such as registers and other circuit nodes, providing input to the logic cone of a component. If the supporting nodes do not use asynchronous control signals and are clocked by $\bar{c}$, when F0 is always zero, or clocked by c, when F1 is always zero, then the component and its gated clock path are safe to optimize using the conversion discussed above. Similarly, if the supporting nodes do not use asynchronous control signals and are clocked by $\bar{c}$, when F0 is always one, or clocked by c, when F1 is always one, then the component and its gated clock path are safe to optimize using the conversion discussed above.

Figure 4:
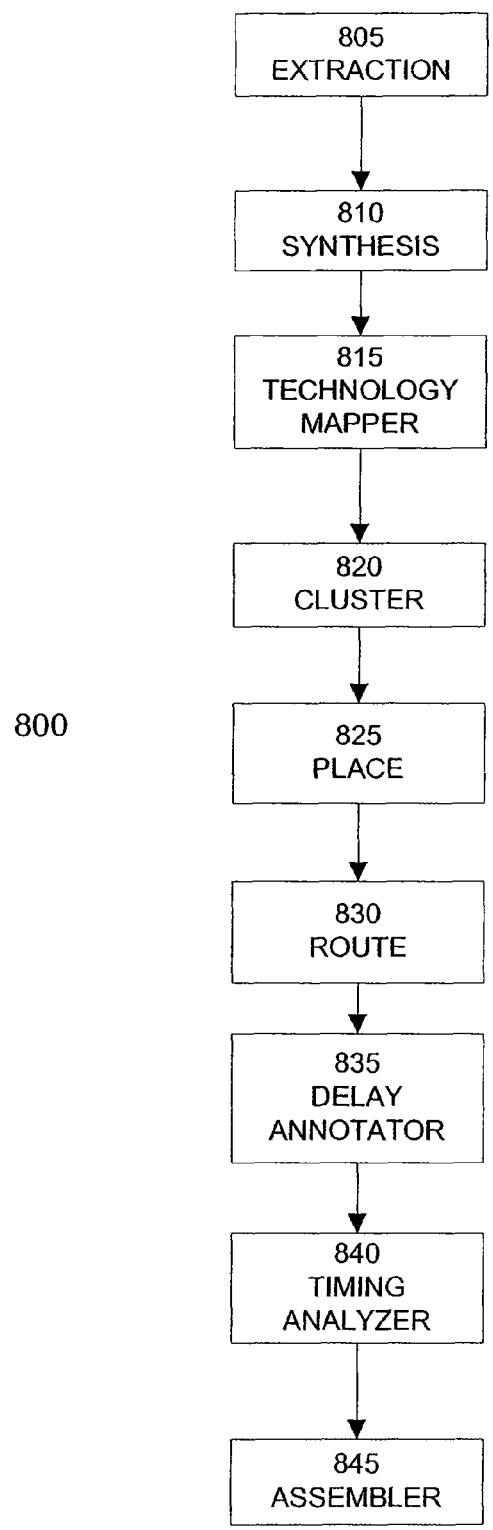
FIG. 4 illustrates an example compilation processing suitable for use with an embodiment of the invention.

FIG. 4 illustrates an example compilation process 800 suitable for use with an embodiment of the invention. The compilation process 800 converts a user design into a programmable device configuration adapted to configure a programmable device to implement the user design. The extraction phase 805 converts a description of the user design, expressed for example in a hardware description language, into a register transfer layer description.

Synthesis phase 810 converts the register transfer layer description of the user design into a set of logic gates. In some implementations, synthesis phase 810 can incorporate embodiments of method 200. Technology mapping phase 815 subdivides the set of logic gates into a set of atoms, which are groups of logic gates matching the capabilities of the logic cells or other functional blocks of the programmable device. A given user design may be converted into any number of different sets of atoms, depending upon the underlying hardware of the programmable device used to implement the user design.

Following the technology mapping phase 815, the cluster phase 820 groups related atoms together into clusters. The place phase 825 assigns clusters of atoms to locations on the programmable device. The route phase 830 determines the configuration of the configurable switching circuit of the programmable device used to connect the atoms implementing the user design.

The delay annotator phase 835 determines the signal delays for the set of atoms and their associated connections in the configurable switching circuit using a timing model of the programmable device. The timing analysis phase 840 determines the maximum operating speed of the programmable device when implementing the user design, for example by determining the portions of the user design have the largest signal delay.

The assembler phase 845 generates a set of configuration information specifying the configuration of the programmable device implementing the user design, including the configuration of each of the logic cells used to implement the user design and the configuration of the configurable switching circuit used to connect the logic cells. The assembler phase 845 can write the configuration information to a configuration file, which can then be used to configure one or more programmable devices to implement instances of the user design.

Figure 5:
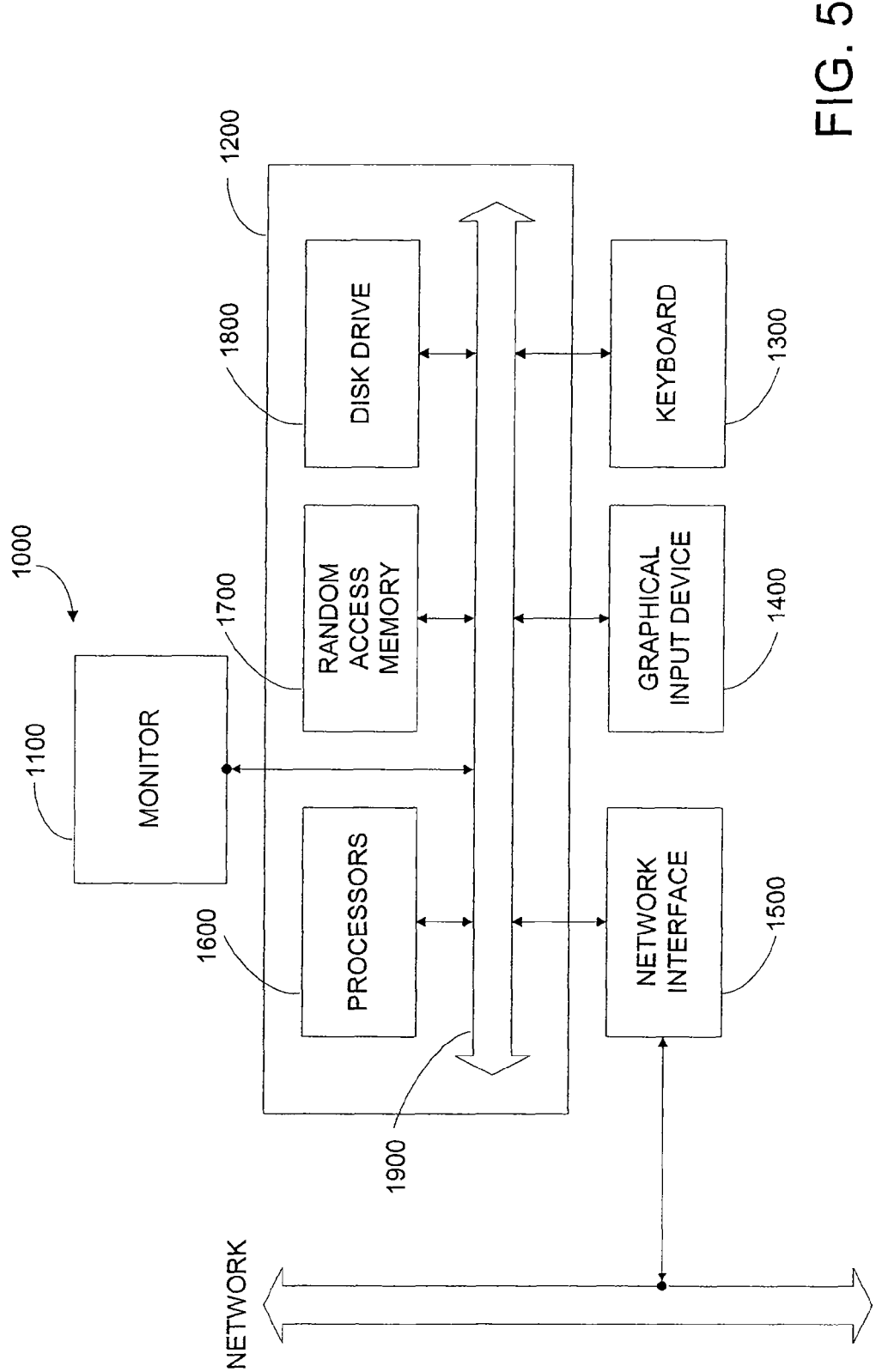
FIG. 5 illustrates an example computer system suitable for implementing an embodiment of the invention.

FIG. 5 illustrates an example computer system 1000 suitable for implementing an embodiment of the invention. Computer system 1000 typically includes a monitor 1100, computer 1200, a keyboard 1300, a user input device 1400, and a network interface 1500. User input device 1400 includes a computer mouse, a trackball, a track pad, graphics tablet, touch screen, and/or other wired or wireless input devices that allow a user to create or select graphics, objects, icons, and/or text appearing on the monitor 1100. Embodiments of network interface 1500 typically provides wired or wireless communication with an electronic communications network, such as a local area network, a wide area network, for example the Internet, and/or virtual networks, for example a virtual private network (VPN).

Computer 1200 typically includes components such as one or more general purpose processors 1600, and memory storage devices, such as a random access memory (RAM) 1700, disk drives 1800, and system bus 1900 interconnecting the above components. RAM 1700 and disk drive 1800 are examples of tangible media for storage of data, audio/video files, computer programs, applet interpreters or compilers, virtual machines, and embodiments of the herein described invention. Further embodiments of computer 1200 can include specialized input, output, and communications subsystems for configuring, operating, testing, and communicating with programmable devices. Other types of tangible media include floppy disks; removable hard disks; optical storage media such as DVD-ROM, CD-ROM, and bar codes; non-volatile memory devices such as flash memories; read-only-memories (ROMS); battery-backed volatile memories; and networked storage devices.

Figure 6:
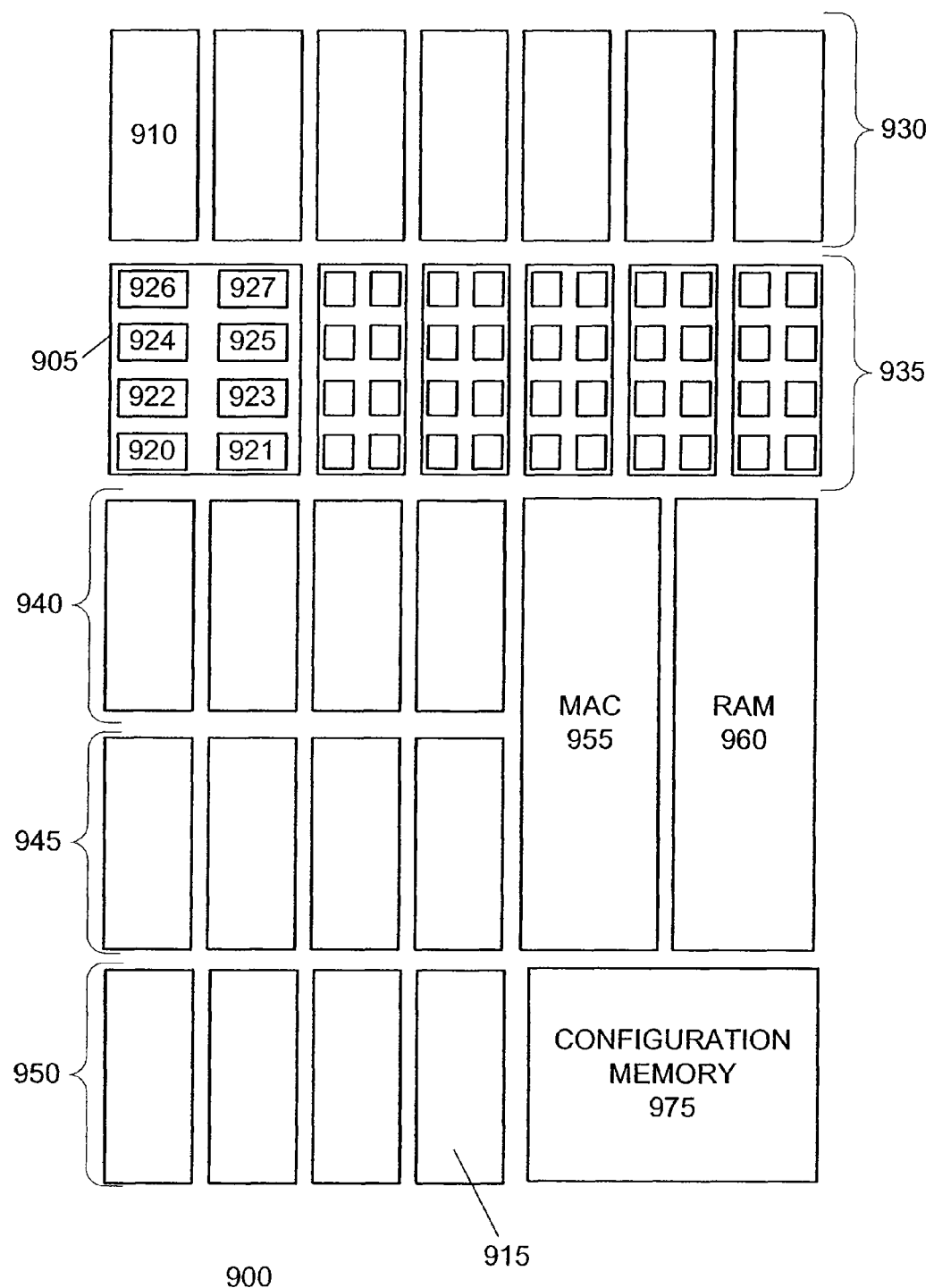
FIG. 6 illustrates an example programmable device suitable for implementing designs processed according to an embodiment of the invention.

FIG. 6 illustrates an example programmable device 900 suitable for implementing a user design processed with an embodiment of the invention. Programmable device 900 includes a number of logic array blocks (LABs), such as LABs 905, 910, 915. Each LAB includes a number of programmable logic cells using logic gates and/or look-up tables to perform a logic operation. LAB 905 illustrates in detail logic cells 920, 921, 922, 923, 924, 925, 926, and 927. Logic cells are omitted from other LABs in FIG. 9 for clarity. The LABs of device 900 are arranged into rows 930, 935, 940, 945, and 950. In an embodiment, the arrangement of logic cells within a LAB and of LABs within rows provides a hierarchical system of configurable connections, in which connections between logic cells within a LAB, between cells in different LABs in the same row, and between cell in LABs in different rows require progressively more resources and operate less efficiently.

In addition to logic cells arranged in LABs, programmable device 900 also include specialized functional blocks, such as multiply and accumulate block (MAC) 955 and random access memory block (RAM) 960. For clarity, the portion of the programmable device 900 shown in FIG. 9 only includes a small number of logic cells, LABs, and functional blocks. Typical programmable devices will include thousands or tens of thousands of these elements.

Further embodiments can be envisioned to one of ordinary skill in the art after reading the attached documents. For example, although the invention has been discussed with reference to programmable devices, it is equally applicable to logic minimization applications used to design any type of digital device, such as standard or structured ASICs, gate arrays, and general digital logic devices. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of modifying an integrated circuit design, the method comprising:
   receiving the integrated circuit design;
   identifying a component in the integrated circuit design receiving a first data signal and clocked by a gated clock signal, wherein the gated clock signal is a first function of a base clock signal and a first input signal;
   identifying a portion of the integrated circuit design receiving the base clock signal, the first input signal, and generating by using a computer the gated clock signal;
   generating an expression for the portion of the integrated circuit design;
   evaluating the expression; and
   in response to a criteria being met during the evaluation, modifying the integrated circuit design by clocking the component with the base clock signal and providing a second data signal to the component, the second data signal generated using the first data signal and a second input signal.

2. The method of claim 1, wherein generating an expression for the portion of the integrated circuit design comprises:
   generating a Boolean expression, wherein the Boolean expression includes a first input variable corresponding with the base clock signal and a second input variable corresponding with the first input signal.

3. The method of claim 2, wherein evaluating the expression comprises:
   reducing the Boolean expression to cofactors of the first input variable; and
   evaluating the cofactors for values of a set of input values of at least the second input variable.

4. The method of claim 3, wherein the criteria comprises a determination that one of the cofactors has a constant value for the set of input values.

5. The method of claim 4, wherein the modified design further includes logic performing a third function to produce the second input signal.

6. The method of claim 5, wherein the third function is equivalent to a non-constant cofactor.

7. The method of claim 1, wherein the second data signal is generated using input logic adapted to hold the component at a current state value when the second input signal is in a first state and to present the first data signal to the data input of the component when the second input signal is in a second state.

8. The method of claim 1, wherein the portion of the integrated circuit design includes combinatorial logic.

9. The method of claim 1, wherein the component is a register.

10. The method of claim 1 further comprising implementing the modified design on a field programmable logic device.

11. A method of modifying an integrated circuit design, the method comprising:
    receiving the integrated circuit design;
    identifying a register in the integrated circuit design, the register clocked by a gated clock signal that is a function of a base clock and at least a first input signal;
    identifying first circuitry generating the gated clock signal;
    generating by using a computer an expression for the first circuitry; and
    evaluating the expression, and in response to a first result resulting from the evaluating,
    modifying the integrated circuit design by clocking the register with the base clock signal and adding second circuitry to a data input of the register.

12. The method of claim 11, wherein the second circuitry holds the register at a current state value when a second input signal is in a first state and presents a data signal to the data input of the register when the second input signal is in a second state.

13. The method of claim 11, wherein the first circuitry comprises combinatorial logic.

14. The method of claim 13, wherein the first result indicates that the combinatorial logic comprises either an AND gate or an OR gate coupled to a clock input of the register.

15. The method of claim 11 further comprising:
    in response to the first result resulting from the evaluating, implementing the modified integrated circuit design on a field programmable logic device; and
    in response to a result of the evaluating being other than the first result, implementing the integrated circuit design on a field programmable logic device.

16. A non-transitory information storage medium comprising a plurality of instructions adapted to direct an information processing device to perform an operation comprising:
    receiving the integrated circuit design;
    identifying a register in the integrated circuit design, the register having a clock input coupled to first circuitry, the first circuitry receiving a base clock and at least a first input signal;
    generating an expression for first circuitry; and
    evaluating the expression, and in response to a first result resulting from the evaluating,
    modifying the integrated circuit design by connecting the clock input of the register to the base clock signal and adding second circuitry to a data input of the register.

17. The information storage medium of claim 16, wherein the second circuitry holds the register at a current state value when a second input signal is in a first state and presents a data signal to the data input of the register when the second input signal is in a second state.

18. The information storage medium of claim 16, wherein the first circuitry comprises combinatorial logic.

19. The information storage medium of claim 18, wherein the first result indicates that the combinatorial logic comprises either an AND gate or an OR gate coupled to a clock input of the register.

20. The information storage medium of claim 16 further comprising:
    in response to the first result resulting from the evaluating, implementing the modified integrated circuit design on a field programmable logic device; and
    in response to a result of the evaluating being other than the first result, implementing the integrated circuit design on a field programmable logic device.

* * * * *